(12) United States Patent
Hacker et al.

(10) Patent No.: US 8,939,403 B2
(45) Date of Patent: Jan. 27, 2015

(54) VEHICLE GALLEY

(75) Inventors: Mark Hacker, Little Horwood (GB); William David Noble, Edmonds, WA (US); Anthony Earl Chamberlin, Seattle, WA (US); Erik Eivind Sutton Nilsen, Mountlake Terrace, WA (US); James Brian Hauser, Clinton, WA (US)

(73) Assignee: B/E Aerospace, Inc., Wellington, FL (US)

( * ) Notice: Subject to any disclaimer, the term of this patent is extended or adjusted under 35 U.S.C. 154(b) by 61 days.

(21) Appl. No.: 13/241,747

(22) Filed: Sep. 23, 2011

(65) Prior Publication Data

US 2013/0076214 A1 Mar. 28, 2013

Related U.S. Application Data

(60) Provisional application No. 61/385,791, filed on Sep. 23, 2010.

(51) Int. Cl.
*B64D 11/04* (2006.01)
*A47B 46/00* (2006.01)

(52) U.S. Cl.
CPC *B64D 11/04* (2013.01); *A47B 46/00* (2013.01)
USPC ........................................................ 244/118.5

(58) Field of Classification Search
USPC ................ 244/118.5, 118.2, 118.1; 312/203, 312/317.3, 319.1, 138.1, 42, 45; 108/93, 108/65, 37
See application file for complete search history.

(56) References Cited

U.S. PATENT DOCUMENTS

| | | | | |
|---|---|---|---|---|
| 1,450,974 A | * | 4/1923 | Heotes | 312/319.1 |
| 2,667,399 A | * | 1/1954 | Swimmer | 312/319.1 |
| 3,199,938 A | * | 8/1965 | Vouk | 312/333 |
| 3,700,301 A | * | 10/1972 | Boeck | 312/215 |
| 4,006,951 A | * | 2/1977 | Geer et al. | 312/332.1 |
| 4,436,356 A | * | 3/1984 | Stelling | 108/93 |
| 5,303,995 A | * | 4/1994 | Kurihara | 312/319.1 |
| 7,338,139 B2 | * | 3/2008 | Peter | 312/107 |
| 2001/0050519 A1 | * | 12/2001 | Kasuya | 312/315 |
| 2005/0218615 A1 | | 10/2005 | Hu | |
| 2008/0001031 A1 | * | 1/2008 | Doebertin et al. | 244/118.1 |

(Continued)

FOREIGN PATENT DOCUMENTS

DE 10 2006 023047 A1 11/2007
EP 1 894 492 A1 3/2008

(Continued)

OTHER PUBLICATIONS

International Search Report for PCT/US2011/052940 dated Apr. 12, 2012.

*Primary Examiner* — Timothy D Collins
*Assistant Examiner* — Richard R Green
(74) *Attorney, Agent, or Firm* — Shumaker, Loop & Kendrick, LLP

(57) ABSTRACT

A modular integrated galley in a passenger vehicle, including a mounting rack in the form of a vertical wall including upper, middle and lower storage areas, at least one storage slot extending laterally between the middle and lower storage areas for storing a work surface therein, and a latch for ejecting the work surface at least partially from the slot into a position for being further extended into a fully deployed position by a user. An elongate hinge that extends vertically along a mounted edge of the doors and is adapted for allowing the door to move 180 degrees of travel between its closed and open positions is also disclosed.

3 Claims, 7 Drawing Sheets

(56) References Cited

U.S. PATENT DOCUMENTS

2008/0165526 A1* 7/2008 Saraiji et al. .................. 362/125
2010/0140890 A1 6/2010 Boivin et al.
2010/0243801 A1* 9/2010 Saint-Jalmes et al. ..... 244/118.5

FOREIGN PATENT DOCUMENTS

| FR | 2 941 916 A1 | 8/2010 |
| GB | 2 160 249 A | 12/1985 |
| WO | 2009/120067 A2 | 10/2009 |

* cited by examiner

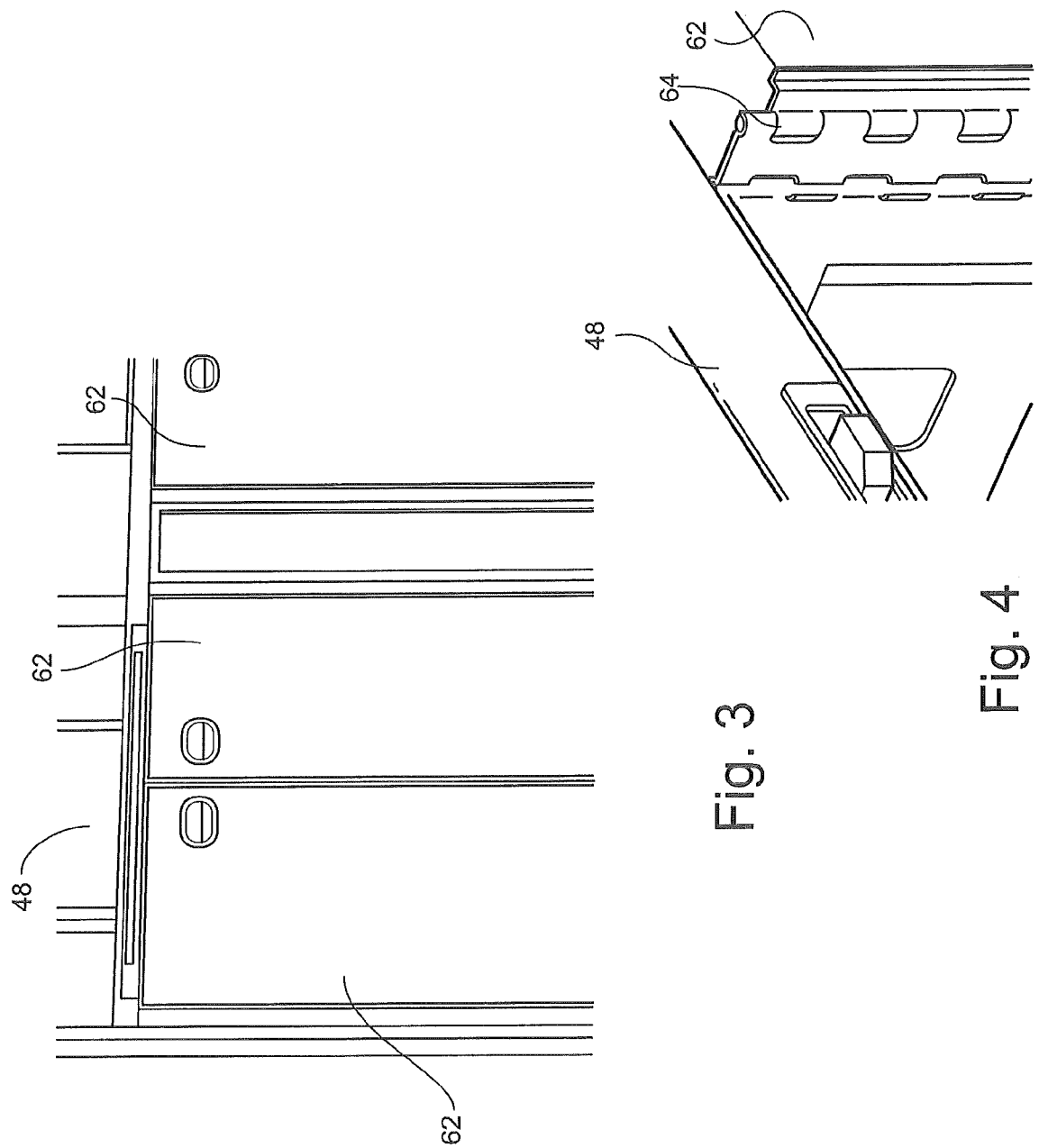

VEHICLE GALLEY

CROSS-REFERENCE TO RELATED APPLICATION

This application claims priority to U.S. Provisional Patent Application No 61/385,791 filed Sept. 23, 2010.

TECHNICAL FIELD AND BACKGROUND OF THE INVENTION

This invention relates to a galley of the general type used in aircraft to prepare meals and beverages in-flight for aircraft passengers. Galleys are typically designed to be as compact as is practical, and to have components such as work surfaces that may be moved when not in use. Within this requirement, galley designs must be adaptable to varying size and shape requirements, and accommodate a wide variety of food and beverage products. In addition, energy efficiency is also important since the galleys' ovens and chillers are powered by either aircraft auxiliary power units or bleed power from one or more aircraft engines. Galleys are also often designed to accommodate and store galley carts when not in use. The present application provides several improvements to galleys while maintaining advantages inherent in prior art designs.

SUMMARY OF THE INVENTION

Therefore, it is an object of the invention to provide a galley having improved galley cart doors and aesthetics;

It is another object of the invention to provide a galley having improved, integrated cart door compartment seals;

It is another object of the invention to provide a galley having improved cart door hinges;

It is another object of the invention to provide a galley having an integrated, easily deployable work surface; and It is another object of the invention to provide a galley that is easy to clean and service.

These and other objects and advantages of the invention are achieved by providing a modular integrated galley in a passenger vehicle that includes a mounting rack in the form of a vertical wall including upper, middle and lower storage areas, at least one storage slot extending laterally between the middle and lower storage areas for storing a work surface therein, and a latch for ejecting the work surface at least partially from the slot into a position for being further extended into a fully deployed position by a user.

According to one embodiment of the invention, the latch includes a first position that unlocks the work surface in its stowed position and a second position that ejects the work surface from the slot into the position for being further extended into the fully deployed position by the user.

According to another embodiment of the invention, a latch is provided on both inboard and outboard sides of each work surface for simultaneous operation by the user.

According to another embodiment of the invention the work surface in its deployed position comprises an extension of a stationary work counter.

According to another embodiment of the invention, a modular integrated galley in a passenger vehicle is provided and includes a mounting rack in the form of a vertical wall including upper, middle and lower storage areas, the lower storage area defining a plurality of storage bays for receiving a plurality of galley carts, each of the storage bays being enclosed by a door with peripheral sealing surfaces cooperating with complementary sealing surfaces on peripheral sealing surfaces of the storage bays for effecting a seal when the door is closed, and further including an elongate hinge extending vertically along a mounted edge of the doors and adapted for allowing the door to move 180 degrees of travel between its closed and open positions.

According to another embodiment of the invention a lower door seal is adapted for engaging a galley deck when the door is closed and adapted for being raised into an upward position when the door is open.

According to another embodiment of the invention, the galley includes a lower door seal adapted for engaging a galley deck when the door is closed and adapted for being raised into an upward position when the door is open, and further including a magnet positioned on a side of the door opposite from the hinge and adapted to urge the lower door seal in a lateral and downwardly direction into a sealing position against the galley deck as the door is closed.

BRIEF DESCRIPTION OF THE DRAWINGS

FIG. 3 is an enlarged view of the lower front of the galley, showing cart door hinges and hinge release;

FIG. 4 is a fragmentary view of a galley cart door in its full open position;

DETAILED DESCRIPTION OF THE PREFERRED EMBODIMENT AND BEST MODE

Figure 1:
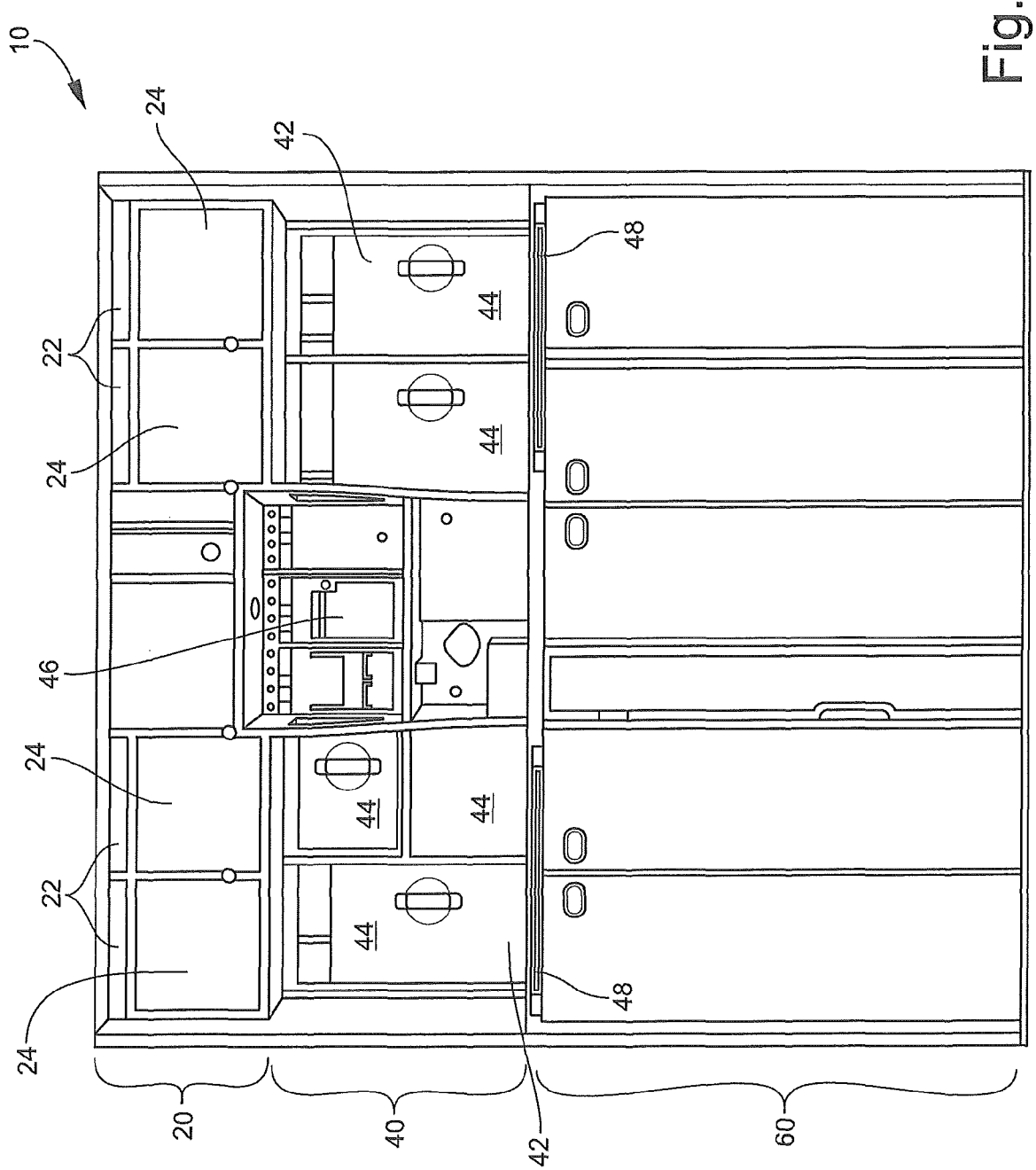
FIG. 1 is a front elevation of a galley according to one embodiment of the invention.

Referring now to the drawings, a galley 10 is shown in FIG. 1 and includes upper, middle and lower storage areas 20, 40 and 60, respectively. The upper storage area 20 includes storage bays 22 enclosed by doors 24 that move between open and closed positions.

The middle storage area 40 includes storage bays 42 enclosed by doors 44 that move between open and closed positions. The middle storage area also includes a central work area that includes a beverage brewing station 46 with related appliances and deployable work surfaces 48 that retract into storage slots when not in use.

Figure 2:
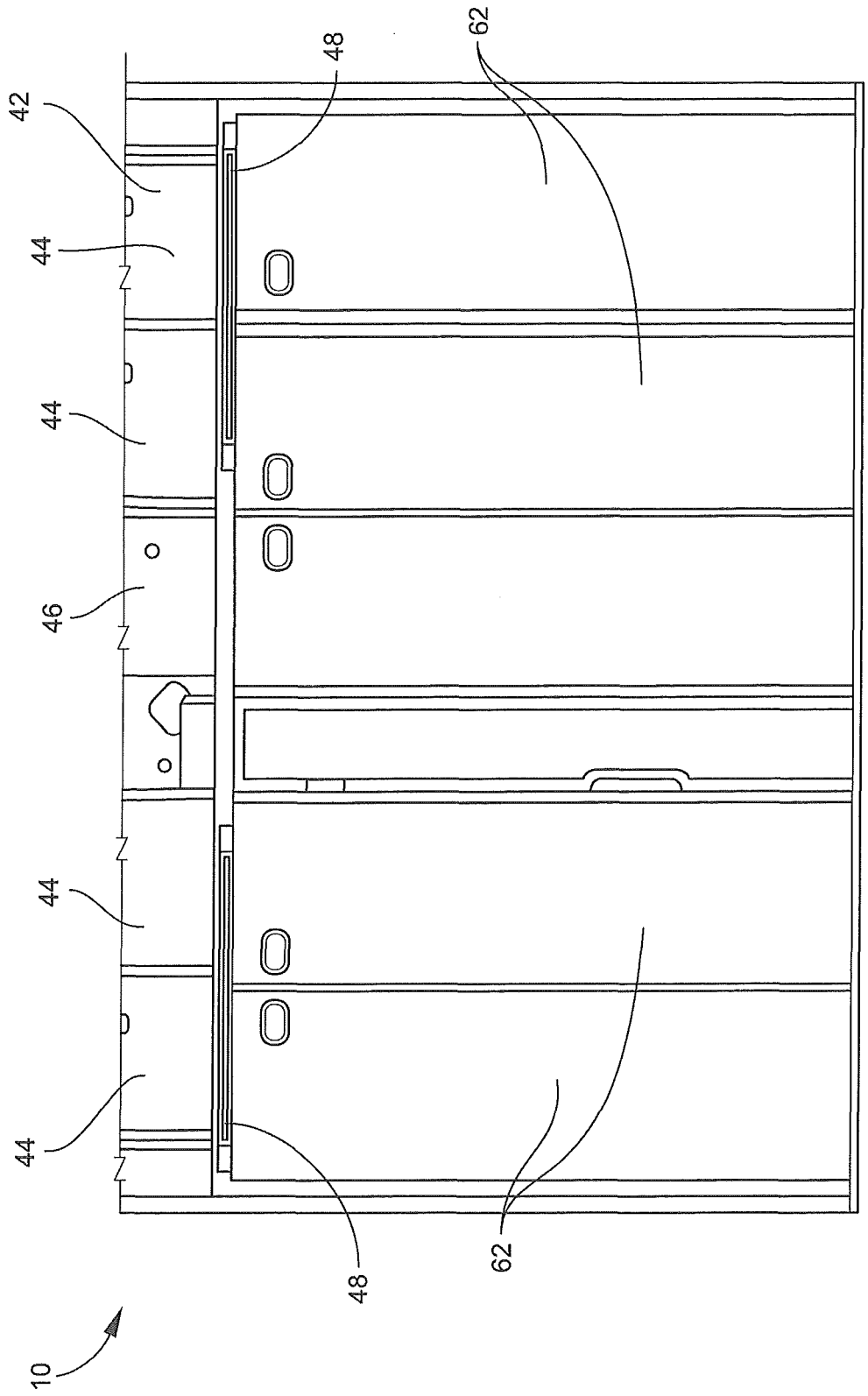
FIG. 2 is a lower front elevation of the galley shown in FIG. 1.

The lower storage area 60 comprises bays for storage of galley carts, the doors 62 of which include several novel features set out in further detail below. See also, FIGS. 2 and 3.

Figure 5:
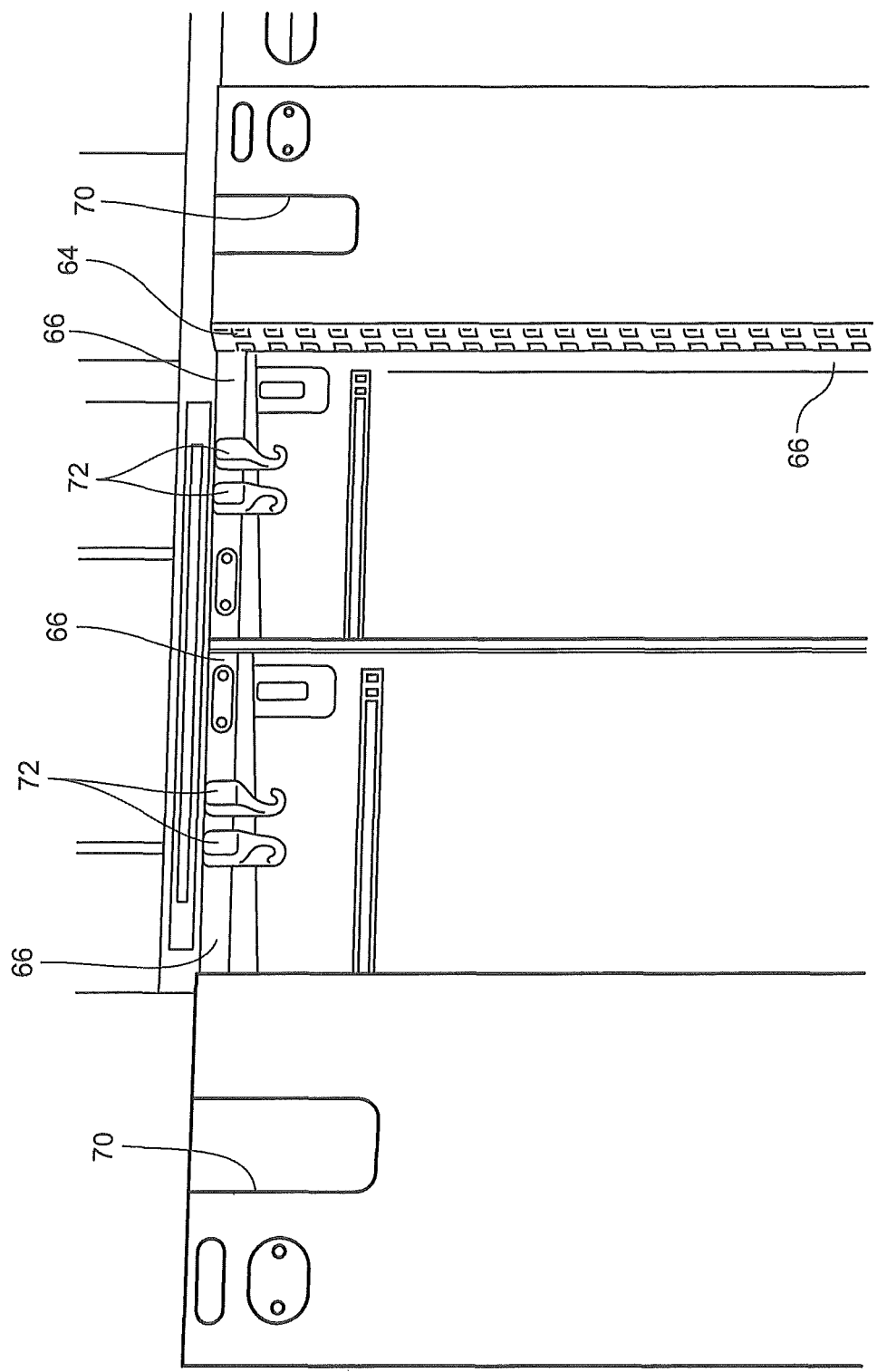
FIG. 5 is an enlarged fragmentary view of the cart doors, particularly showing the cart door seals and the face-to-face configuration of the cart door seals.

As shown in FIGS. 4 and 5, the galley cart door hinges 64 are fabricated of high density plastic co-molded with steel sleeves to achieve both lightweight and long-lasting strength. As also shown, the hinges 64 have a full 180 degrees of travel enabling the doors 62 to fold back flush with the galley wall. Galley door seals 66 extend around the periphery of the door frames and enable the doors 62 to close into a flush, sealed position around the entire periphery of the doors 62. Note the recesses 70 in the back wall of the doors 62 that accommodate the galley cart latches 72.

Figure 7:
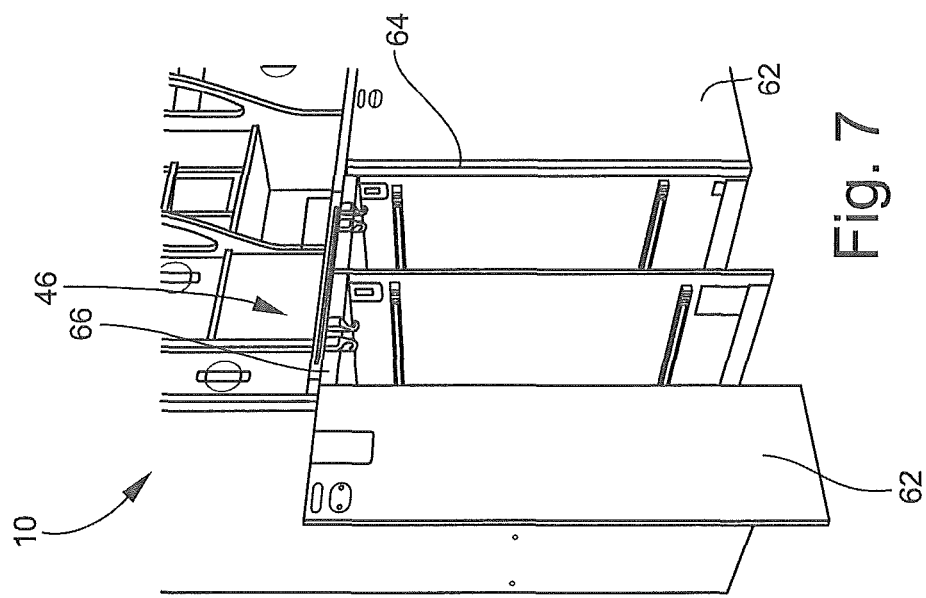
FIG. 7 is a perspective view of the galley cart doors in an open position.
Figure 6:
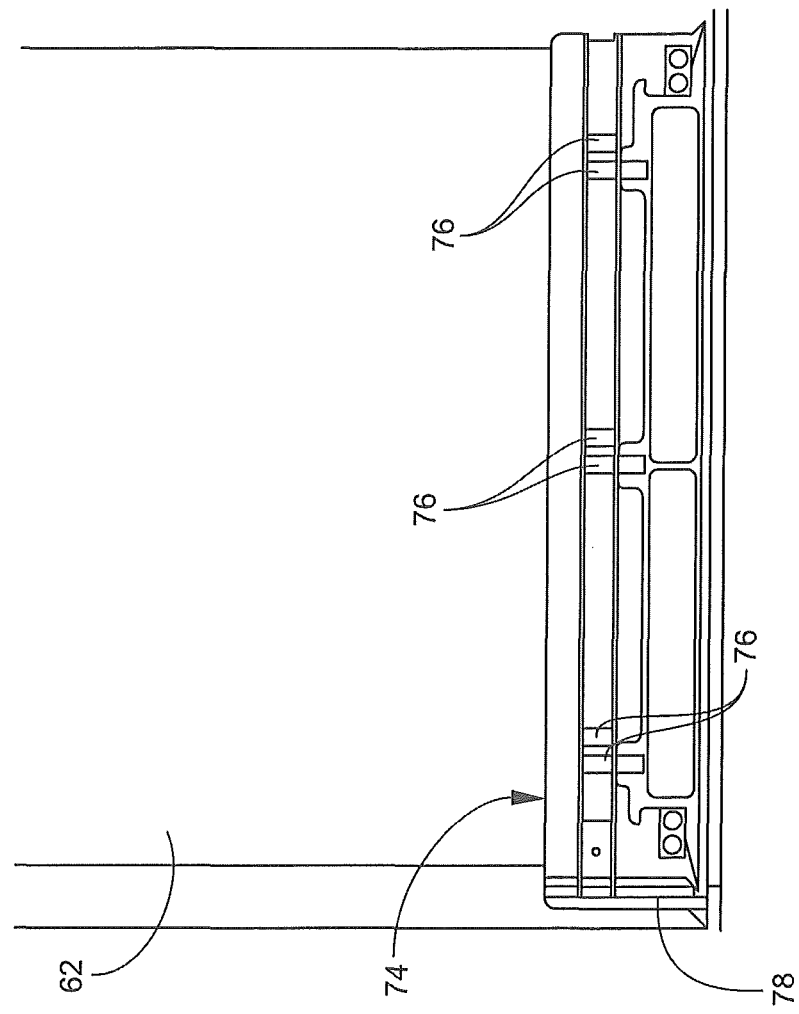
FIG. 6 is an enlarged, fragmentary view of the lower door seal.
Figure 9:
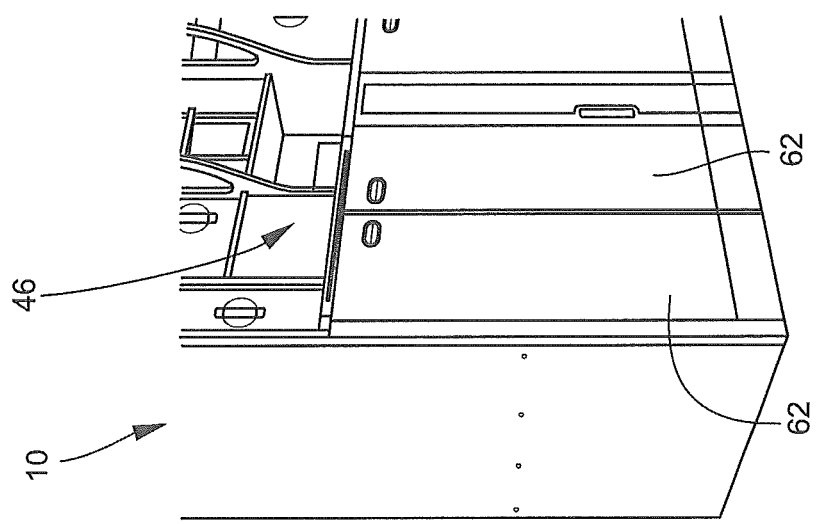
FIG. 9 is a perspective view of the galley cart doors in the closed position.
Figure 8:
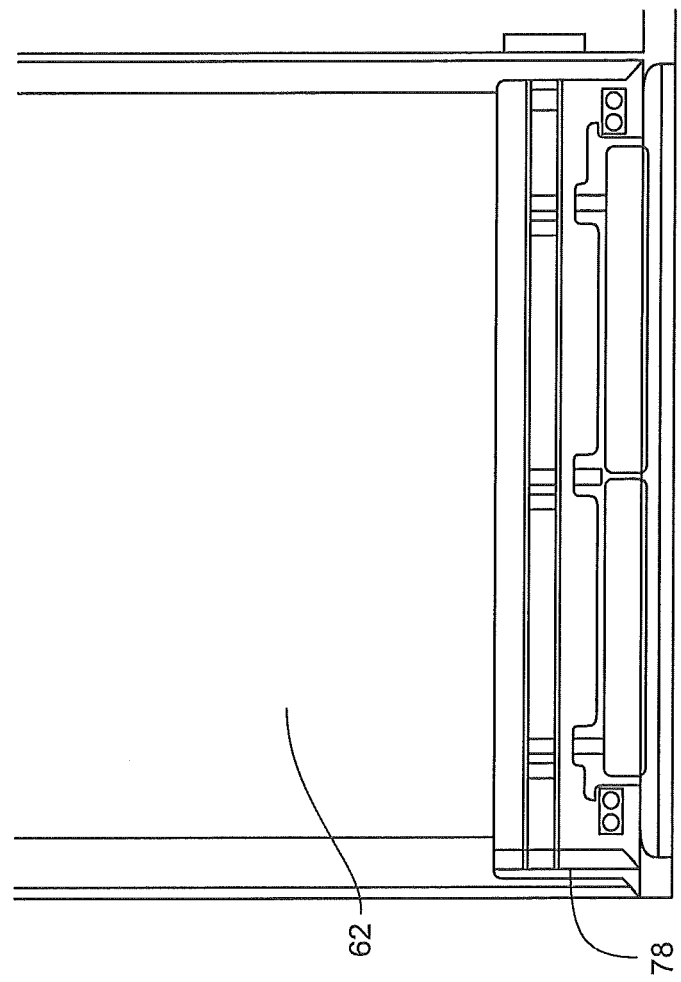
FIG. 8 is an enlarged, fragmentary view of the lower door seal.

Referring to FIGS. 6 and 7, a lower door seal 74 engages the galley deck when the door 62 is closed and is raised into an upward position when the door 62 is open. The door 62 is retained in the open position by magnets 76 mounted on the back side of the door 62. Each of the doors 62 is so equipped. As is shown in FIGS. 8 and 9, when the door 62 is closed a magnet 78 located on the opposite side of the door 62 from the hinge 64 pushes the lower door seal 74 laterally, causing magnetic opposition to slide the lower door seal downwardly into sealing engagement with the galley deck.

Figure 10:
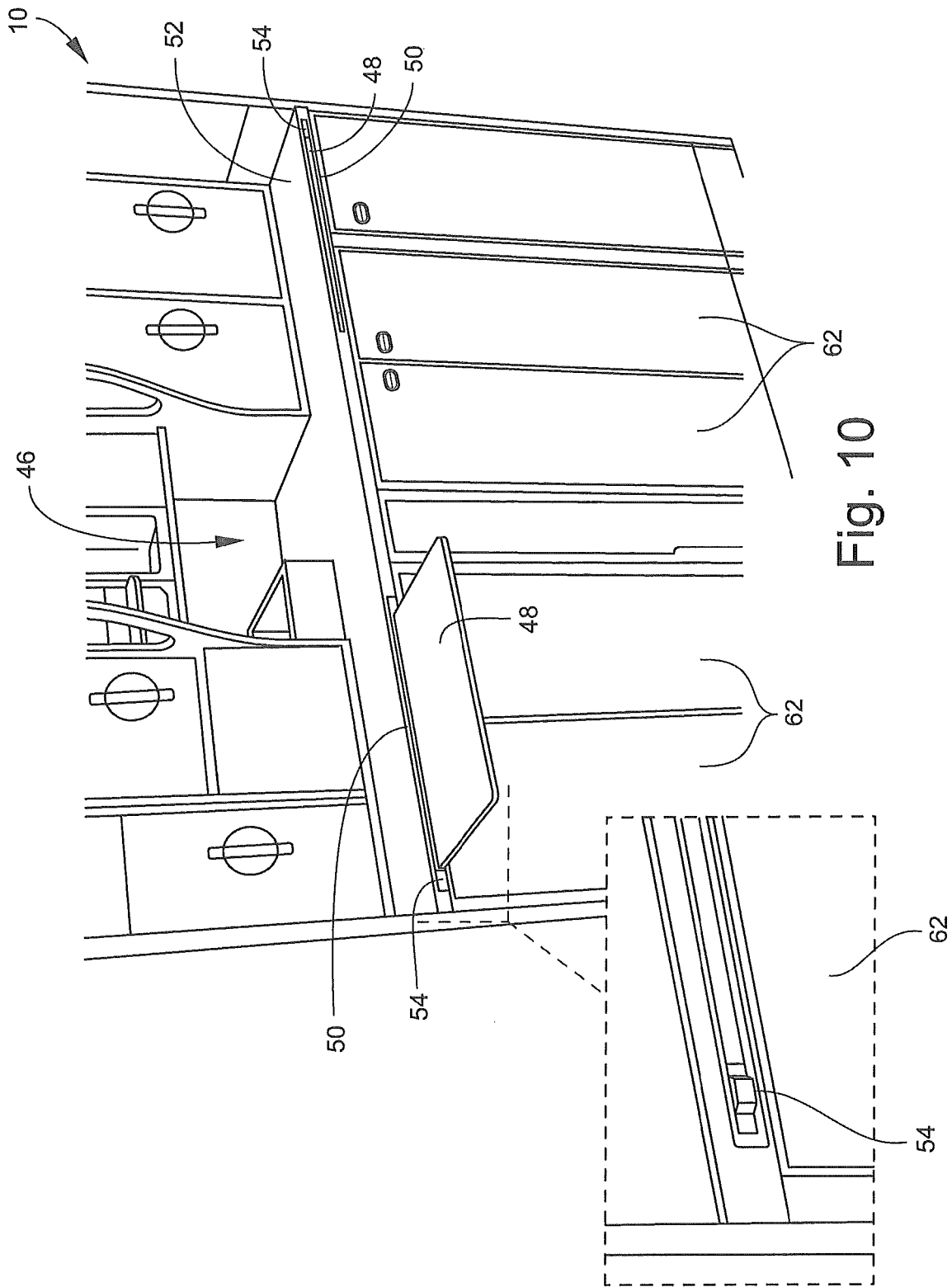
FIG. 10 is an enlarged, fragmentary view of the galley, particularly illustrating deployment and use of the work surfaces with an inset showing the work surface latch.

As shown in FIG. 10, work surfaces 48 are positioned in storage slots 50 positioned beneath the principal work counter 52 when not in use. Latches 54 enable the work surfaces to be stowed flush with the counter 52. Each latch is a two-position latch, the first movement of which unlocks the work surface 48 and the second movement of which releases and ejects the work surface 25 mm, providing sufficient purchase so that the attendant can then grasp the edge of the work surface 48 and pull it out to a full 300 mm extension for use. The process is repeated in reverse to stow the work surface 48.

A galley is disclosed above. Various details of the convertible passenger seat assembly may be changed, altered, revised or rearranged without departing from the spirit and intended broad and general scope of the invention. Furthermore, the foregoing description of exemplary or preferred embodiments of the invention and the best mode for making, using and practicing the invention are provided for the purpose of illustration only and not for the purpose of limitation. Instead, the scope of the invention is defined by the appended claims.

We claim:

1. A modular integrated galley in a passenger vehicle, comprising: a mounting rack in the form of a fixed vertical wall, that is at all times non-movable, including upper, middle, and lower storage areas, each of the storage areas accessible only on a single side of the fixed vertical wall and having a plurality of doors, at least one storage slot extending laterally between the middle and lower storage areas for storing a work surface therein that is independent from a galley car, and a latch for ejecting, by an exclusively sliding motion, the work surface at least partially from the slot into a position for being further extended, by an exclusively sliding motion, into a fully deployed position by a user, wherein the work surface in its deployed position comprises an extension of a stationary work counter.

2. A modular integrated galley according to claim 1, wherein the latch includes a first position that unlocks the work surface in its stowed position and a second position that ejects the work surface from the slot into the position for being further extended into the fully deployed position by the user.

3. A modular integrated galley according to claim 2, wherein a latch is provided on both inboard and outboard sides of each work surface for simultaneous operation by the user.

* * * * *